United States Patent
Laviolette et al.

(10) Patent No.: US 8,429,484 B2
(45) Date of Patent: Apr. 23, 2013

(54) DIGITIZED RADAR INFORMATION REDUNDANCY METHOD AND SYSTEM

(75) Inventors: Kerry D. Laviolette, Liverpool, NY (US); James A. Kanyok, Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1037 days.

(21) Appl. No.: 12/425,294

(22) Filed: Apr. 16, 2009

(65) Prior Publication Data

US 2010/0269007 A1    Oct. 21, 2010

(51) Int. Cl.
*G06F 11/00* (2006.01)

(52) U.S. Cl.
USPC ........................................................ 714/752

(58) Field of Classification Search .................... 714/752
See application file for complete search history.

(56) References Cited

U.S. PATENT DOCUMENTS

| | | | |
|---|---|---|---|
| 5,831,570 A | 11/1998 | Ammar et al. | |
| 5,889,821 A * | 3/1999 | Arnstein et al. | 375/285 |
| 7,321,905 B2 | 1/2008 | Hartline et al. | |
| 7,907,512 B1 * | 3/2011 | von der Embse | 370/208 |
| 2002/0053062 A1 | 5/2002 | Szymanski | |
| 2003/0081582 A1* | 5/2003 | Jain et al. | 370/338 |
| 2004/0218919 A1 | 11/2004 | Hunsche et al. | |
| 2005/0262284 A1* | 11/2005 | Cherukuri et al. | 710/307 |
| 2007/0005248 A1* | 1/2007 | Averill et al. | 701/301 |
| 2008/0028276 A1* | 1/2008 | Li et al. | 714/752 |
| 2009/0045997 A1* | 2/2009 | Meyers et al. | 342/60 |

OTHER PUBLICATIONS

International Search Report dated Jul. 29, 2010 for related PCT application PCT/US 10/31349.

* cited by examiner

*Primary Examiner* — Scott Baderman
*Assistant Examiner* — Yair Leibovich
(74) *Attorney, Agent, or Firm* — Howard IP Law Group, PC (57) ABSTRACT

The present invention relates to a real time radar data transmission system and process for transmitting forward error correctable data to a plurality of parallel communication channels.

21 Claims, 12 Drawing Sheets

DIGITIZED RADAR INFORMATION REDUNDANCY METHOD AND SYSTEM

FIELD OF INVENTION

The present invention relates generally to radar data transmission systems for digitized returns and more specifically to a system and process for the recovery of missing data and correction of erroneous data in networks disposed to transmission errors.

BACKGROUND

Modern radars use digital communication networks to move antenna element data and partially processed data from temporary storage to computer and from computer to computer. However, each communication link crossed, e.g., from element to element, has a probability of error that can range from $10^{-9}$ to $10^{-12}$. When data rates are moderate an error can occur every few seconds. For example, dozens of networked elements operating at $10 \times 10^9$ bits per second having an error rate of $10^{-12}$ will on average experience an error every 1 to 2 minutes. Given that these radars are real-time sensors with very high data rates, it is not practical to employ traditional re-transmission techniques to recover the erroneous data.

A non exhaustive list of typical methods for solving the error rate problem includes: (a) dropping the corrupt data and requesting reschedule via normal activity; (b) interpolating between local data; (c) buffering element data for some number of frames and allowing the frames to be re-requested upon detection of corrupt of data in the transmission chain; (d) forwarding error correction coding with the data; (e) using fully redundant networks that buffer the data that then use the data for full failover recovery; and (f) accepting the errors and missing data. Data buffering requires significant memory buffering and processing overhead, as well as additional weight, power, space, and cost to the system due to added components. In the event of an error, retransmission of data interrupts the normal data flow, and in the event of excessive errors can prevent the data from getting through at all. Error acceptance without correction is often intolerable to effective system operation. A solution that employs a real time system and method that selects data having the greatest integrity for each element between a particular data path is highly desirable.

Figure 1A:
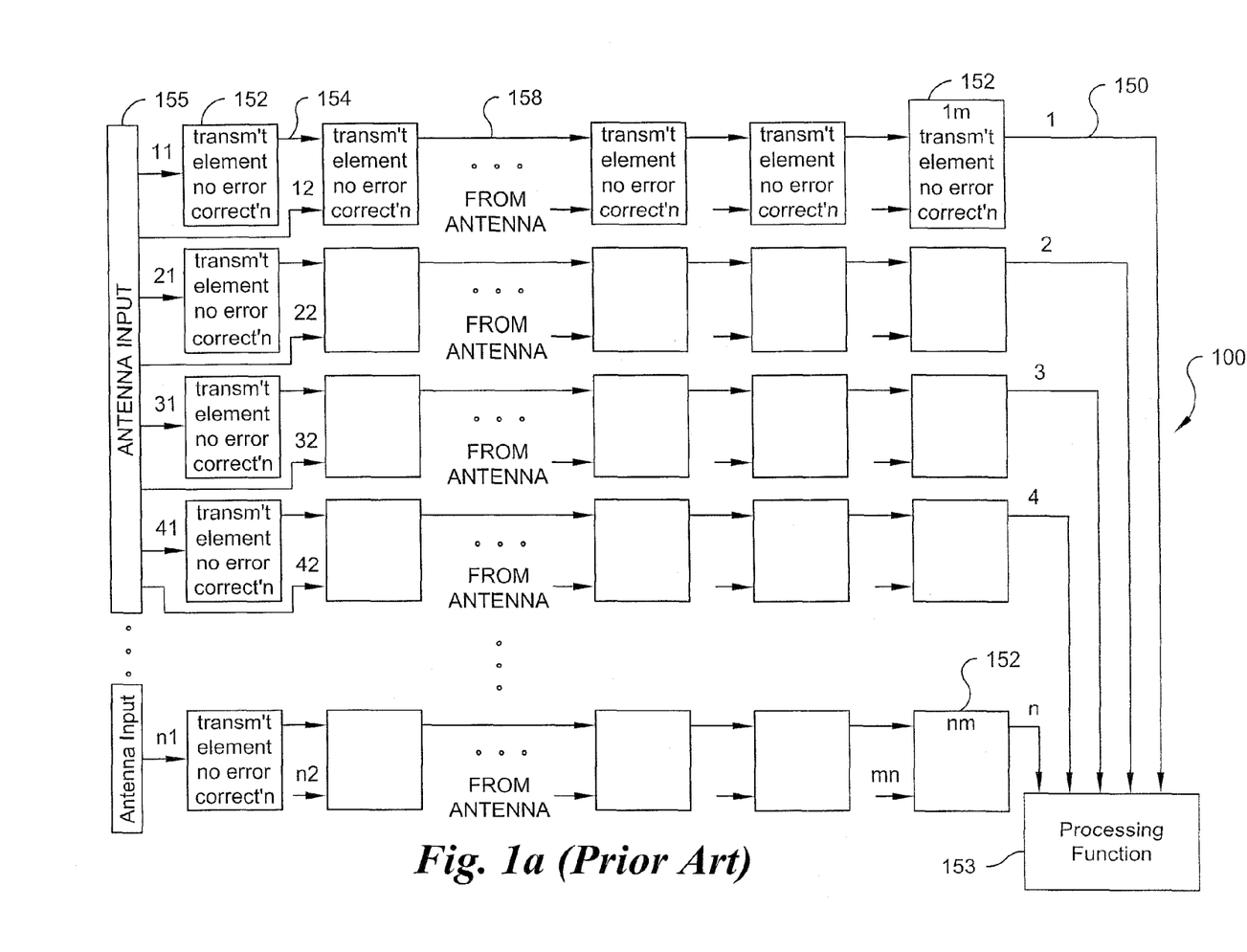
FIG. 1a is a block diagram of a prior art radar system network architecture.

FIG. 1a illustrates a prior art high-speed data network 100 for a radar system that for purposes of illustration receives radar data via input 155. It is understood that antenna input 155 refers to input supplied from a radar antenna or a computer having a memory that stores radar data. By way of example, the data input 155 may transfer via a direct memory access (DMA) engine to network 100 for transmission to a processor 153 comprising a computer and memory for processing. Typically the data transfers comprise 16-bit words, but any word length may be employed consistent with the requirements of a particular radar system. Further, each data word may be formatted for transmission into smaller bytes having such data integrity schema as parity codes and cyclical redundancy check (CRC) code generation, as well as the means for the creation of check sums for the transmitted word, which is by convention typically appended to the data stream. A check sum function produces as output a value of a certain fixed size. A CRC generally may be used as a checksum to detect accidental alteration of the data during transmission or storage. Data transmission systems generally can also include more robust forward error correction schemes such as repetition schemes, convolution codes and block codes such as a Hamming code, Reed-Solomon code, Reed-Muller code, Binary Golay code and Bose-Chaudauri-Hocquenghem Code. These schemes in addition to parity schemes, cyclic redundancy checks, single error correcting (SEC), and double error detecting (DED) are well known by those of ordinary skill in the art of data storage and transmission.

In the block diagram illustrated in FIG. 1a one or more communication channels $150_1$ through $150_n$, have transmission elements $152_{mn}$, such as transmission element $152_{11}$ that works in parallel with other channel transmission elements ($152_{21}$, $152_{31}$, ... $152_{n1}$) to obtain a higher aggregate data rate. Each of the transmission elements $152_{mn}$ receives antenna data input from antenna input 155 as shown by the data input arrows numbered 11, 12, ... 21, 22 ... mn. In one implementation of the prior art system, a 10 Gigabits (Gb) Ethernet uses four (4)×2.5 Gb channels or lanes to achieve the required throughput. Such throughput is achieved utilizing components, such as serializer/deserializers, as the actual transmission elements $152_{nm}$. The data is parsed and inputted into the elements $152_{nm}$ as serial bytes having bit length (1/n)*(word length). In a typical example, as illustrated in FIG. 1a, first channel $152_{11}$ receives bytes 1, 5 and 9 of a given data segment; whereas a second channel $152_{21}$ receives bytes 2, 6 and 10, and so on. The elements $152_{nm}$ may also encode the data, as for example 16 bits into 20 bits (e.g., 8 bits/10 bit encoding) for transmission over network 100 having parallel channels via associated transmission elements, such as transmission elements $152_{12}$ through $152_{1m}$ that may support serial interfaces in high-speed data network applications.

The data is communicated over transmission medium or channel transmission 150, 154, and 158 that serve as links between the transmission elements $152_{nm}$ within the network 100. The network 100 may comprise any medium or combination thereof for data transmission such as: (a) parallel twisted pair of copper lines for electrical transmission, (b) distinct wavelengths, if transmitted using fiber optics, or (c) microwave transmitters and associated receivers, operating via a medium such as air. If the microwave receivers are point to point, they may operate at the same frequency; if over a single channel the transmission may be coded (e.g., CDMA, TDMA) or may be at different frequencies. However, the prior art radar signal transmission elements $152_{nm}$, such as transmission element $152_{11}$ that work in parallel with elements associated with other channels (e.g. $150_2$, ... $150_n$) do not provide for forward error correction. Any data error detection and potential correction is performed in the processing function 153 such as a computer processor.

Figure 1B:
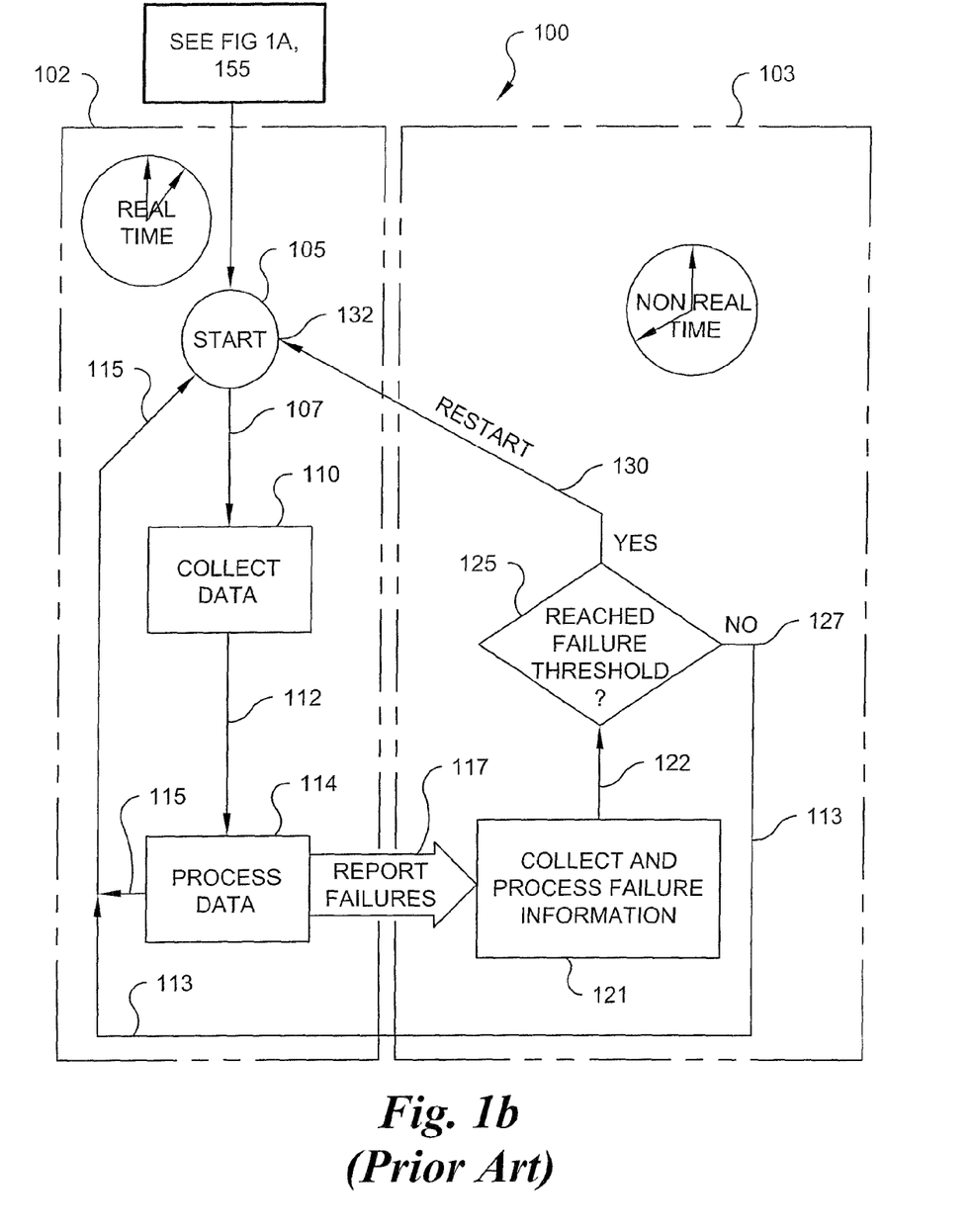

FIG. 1b is a flow chart of a prior art process 102 that works in conjunction with the prior art system illustrated in FIG. 1a. Processes operate in real time to process the data input via antenna data input 155 through network 100 (FIG. 1a). At the start or input 105 a real time processing module labeled generally as 102 is invoked. Real time processing function or module 110 receives and collects or stores data 107, which is generally embodied in the data conveyed via radar signal transmission elements $152_{nm}$ described in FIG. 1a. The final elements $152_{nm}$ (where n equals the number of parallel channels) of the system of FIG. 1a transfers data 112 to a process 114 where typically a forward correction code computation is performed to determine if the data's integrity is in tact, (i.e., that no errors are detected in the transmission of data). Real time process module 114 may be embodied in a computer processor 153 (FIG. 1a). If an error computation, such as a CRC computation indicates that no errors are present, then the CRC value appended to the data stream on transmission is stripped from the data stream or packet and the data is stored in a system memory and subsequently transferred via DMA to service various radar applications.

If no error was detected a signal 115 indicates to module 105 to commence transmitting the next sequence (e.g., a record, frame or packet) of data through the network 100 (FIG. 1a). However, if an error is detected then an error indication is reported via flow path 117 to a non-real time process, or module labeled generally as 103. Process 103 includes a means, or module for the collection and processing of error information 121. A count of the detected errors in the data sequence 122 is computed in the means for the collection and processing of error information 121 and communicated to a compare process 125 to determine whether the number of detected errors exceeds a threshold value. If the number of errors have not exceeded the threshold, then a signal is output via flow path 127 from the comparator 125 that indicates to antenna data input 105 to transmit the next sequence (e.g., a record, frame or packet) of data through the network 100 (FIG. 1a) and the process 121 returns to a wait state. If an error has occurred and the number of errors has exceeded the threshold then the signal is not transmitted from compare module 125 via flow path 127 and received by start module 105 for processing the next sequence (e.g., a record, frame or packet) of data through the network 100 (FIG. 1a). Instead, data flow is interrupted via signal 132 such as a signal restart, reset or resynchronization signal to module 105 communicated via flow path 130. Errors exceeding the threshold thus often force a resynchronization event in a radar application, limiting the radar's availability. In addition to forcing a time consuming resynchronization event in a radar application, the foregoing prior art radar architecture lacks error correction mechanisms (e.g. error correction) for correcting errors before reaching data processing module 114. Alternative methods and systems are desired.

SUMMARY OF THE INVENTION

A real time radar data transmission system comprising: a plurality of parallel communication channels, each channel having a plurality of serially associated directional transmission elements and having one or more inputs for receiving forward error correctable data and one or more outputs for transmitting forward error correctable data; wherein at least one of the plurality of the directional transmission elements receives the forward error correctable data and corrects the data in error; and transmits the forward error correctable data to a serially associated directional transmission element; and wherein the data from the last of the plurality of serially associated directional transmission elements provides input to a processor programmed to utilize the forward error correctable data in a radar application.

A radar data transmission process comprising: transmitting forward error correctable data to a plurality of parallel communication channels, each channel having a plurality of serially associated directional transmission elements having one or more inputs for receiving forward error correctable data; receiving the forward error correctable data; correcting the data in error; transmitting the forward error correctable data to a serially associated directional transmission element; processing the data from the last of the plurality of serially associated directional transmission elements; comparing in non-real time a number of error corrections made to the data to a threshold; and if the number of corrections exceed the threshold then resynchronizing the transmitting of forward error correction data in real time.

BRIEF DESCRIPTION OF THE DRAWINGS

Understanding of the present invention will be facilitated by consideration of the following detailed description of the preferred embodiments of the present invention taken in conjunction with the accompanying drawings wherein:

FIG. 1b is a process flow chart of the prior art system of FIG. 1a;

DETAILED DESCRIPTION

It is to be understood that the figures and descriptions of the present invention have been simplified to illustrate elements that are relevant for a clear understanding, while eliminating, for the purpose of clarity, many other elements found in radar systems and methods of making and using the same. Those of ordinary skill in the art may recognize that other elements and/or steps may be desirable in implementing the present invention. However, because such elements and process steps are well known by those of ordinary skill in the art, and because they do not facilitate a better understanding of the present invention, a discussion of such elements and steps is not provided herein. Furthermore, while the present invention is described in relation to a radar system, it is understood that the invention is applicable to other complex systems wherein error correction of transmitted and/or received information data is required.

Figure 2A:
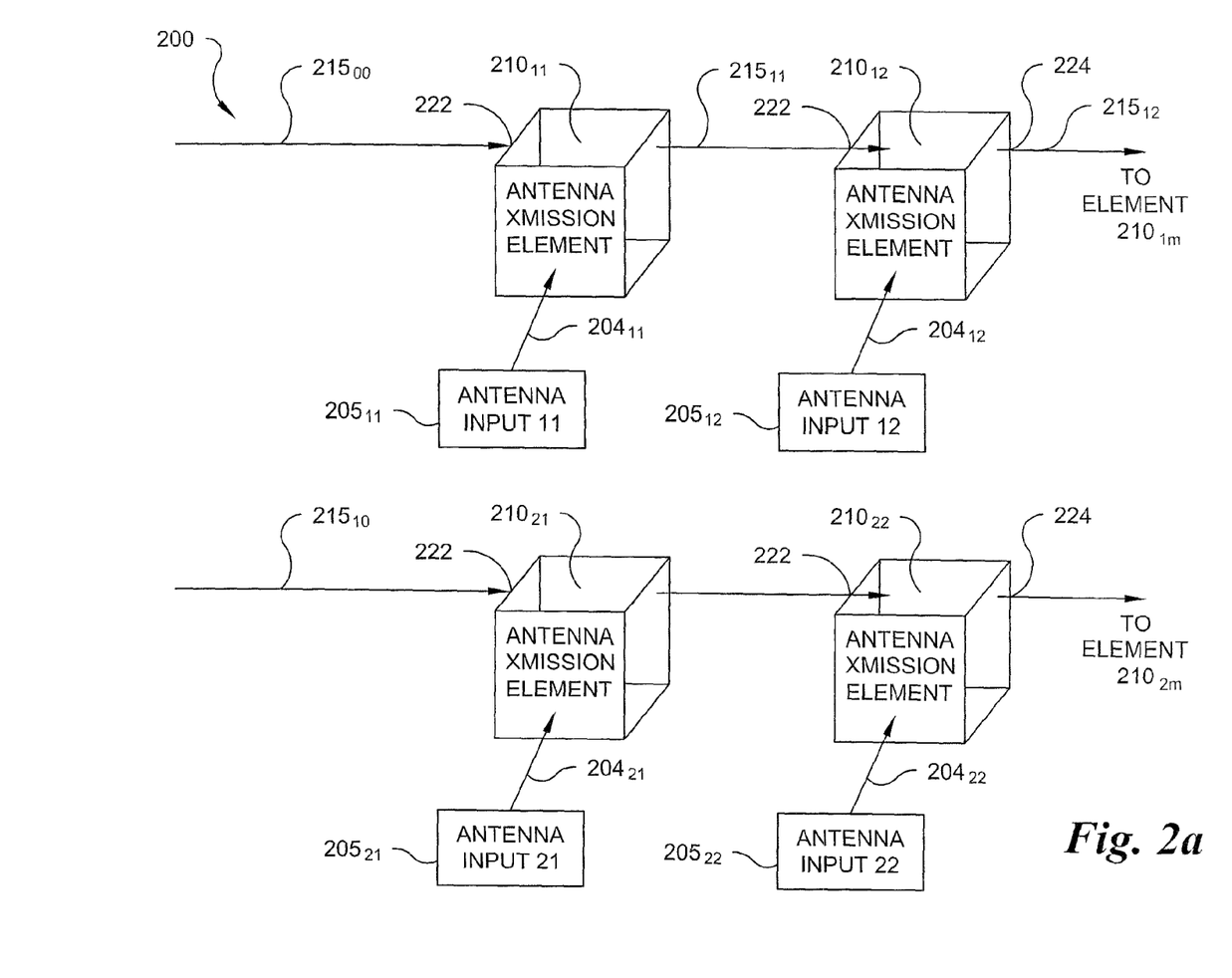
FIG. 2a is a partial block diagram of a system according to an embodiment of the present invention.

In accordance with an embodiment of the invention, FIG. 2a illustrates schematically functional components of a real time radar data transmission network 200 comprising: a plurality of parallel communication channels labeled generally as 204 with each channel having a plurality of serially associated directional transmission elements labeled generally as 210. Each serially associated directional transmission element has an input 222 for receiving forward error correctable data and one or more outputs 224 for transmitting forward error correctable data. At least one of the directional transmission elements ($210_{mn}$) is configured to receive the forward error correctable data (e.g. $215_{00}$) and correct the data in error and transmit the forward error correctable data to a serially associated directional transmission element (e.g. $210_{12}$). This process occurs sequentially down the chain of serially coupled elements such that the data from the last of the serially associated directional transmission elements ($210_{1m}$) provides input to a processor programmed to utilize the data relating to the forward error correcting code. The processor is configured to compare in non-real time the number of error corrections to a threshold; and if the number of corrections exceeds the threshold then halting the transmission and restarting, resetting, or resynchronizing the transmission of data in real time.

In the exemplary embodiment shown in FIG. 2a, the data on parallel communication channel $204_{11}$ represents data from a radar antenna element $205_{11}$. The forward error correctable data $215_{00}$ is accumulated in element $210_{11}$ with data on parallel communication channel $204_{11}$ and passed through as forward error correctable data $215_{11}$. Forward error correctable data $215_{11}$ is passed to element $210_{12}$ where it is accumulated with the data on parallel communication channel $204_{12}$. Element $210_{12}$ accumulates data from parallel communication channel $204_{12}$ and forward error correctable data $215_{11}$ and passes forward error correctable data $215_{12}$ to elements down the serial chain of elements to a final element $210_{nm}$. Parallel elements represented by the serial chain having forward error correctable data (e.g. $215_{10}$ input to element $210_{21}$) operate in the exact manner as described above for each of the parallel antenna elements $210_{1m}$, $210_{2M}$, $210_{nm}$.

Figure 2B:
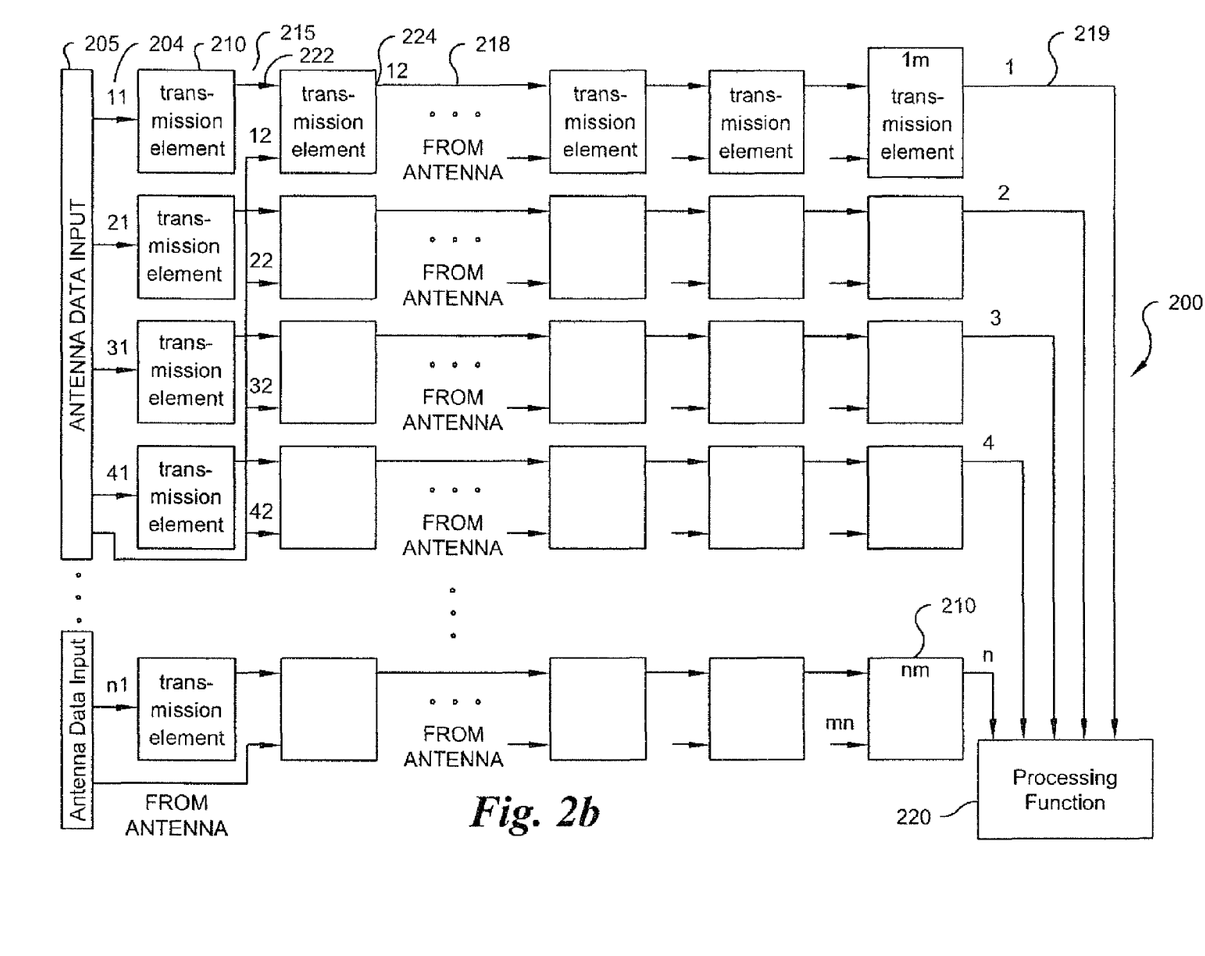
FIG. 2b is a block diagram of a system according to an embodiment of the present invention.

More particularly in accordance with an embodiment of the invention, FIG. 2b illustrates a high-speed data network architecture 200 that receives radar signal data from radar antenna data input 205. It is understood that data from one or more radar antenna elements may be embodied by a radar antenna or a computer having a memory that stores the radar data. By way of example, the data input 205 may transfer via a DMA engine to a physical network 200 for transmission to processor 220 comprising for example a computer processor (such as digital signal processor) and memory for processing the received signal data. Typically the data transfers comprise 16-bit words but other word lengths are possible with no modification of the principles embodied herein. Further, each data word is formatted for transmission having forward correction codes such as parity codes and/or CRC codes as well as the means for forward correction, which may be appended or incorporated into the data stream.

Each transmission element in FIG. 2b is a directional transmission element such as element $210_{nm}$ that performs a process that collects data and tests the data as to whether the data contains errors. Typically, the process performs a forward correction test such as a CRC check to determine if the data's integrity is in tact, i.e., that no errors are detected. Each of the directional transmission elements $210_{nm}$, (e.g. $210_{11}$) processes an error correction and data integrity determination process. This is typically a CRC check as described herein for each segment of a record, frame or packet being transmitted by the transmission element $210_{11}$. If the data, record, frame or packet contains an error determined by a data integrity determination process, then a correction is made and the corrected data is stored in an access buffer (not shown) for transmission to the next transmission in succession (e.g. $210_{12}$). The final element (e.g. $210_{1m}$) transmits the data, record, frame or packet to processor 220 over a particular channel (e.g. channel 1).

In the block diagram illustrated in FIG. 2b one or more parallel communication channels $204_1$ through $204_n$, each having m transmission elements labeled $210_{nm}$ (where n corresponds to the particular communication channel 1-4) work in parallel with other channels (e.g. $204_2$ through $204_n$) to obtain a higher aggregate data rate. For example, one implementation of a 10 Gb Ethernet uses 4×2.5 Gb channels or lanes to achieve the required throughput. Such throughput is achieved utilizing components, such as serializers/deserializers, as the actual transmission elements $210_{nm}$. The data is parsed and inputted into the elements $210_{nm}$ as bytes having length n. In a typical example, as illustrated in FIG. 2b, first transmission element $210_{11}$ receives bytes 1, 5 and 9; whereas a second transmission element $210_{21}$ receives bytes 2, 6 and 10, and so on. The elements $210_{nm}$ may also encode the data, as for example 16 bits into 20 bits (e.g., 8 bits/10bit encoding) for transmission over network 200 having parallel channels via associated transmission elements, such as transmission elements (e.g. $210_{12}$ through $210_{1m}$ for channel 1) that may support serial interfaces in high-speed data network applications. The data is communicated over transmission medium 218 that serves to link the transmission elements $210_{nm}$ within the network 200. Transmission medium 219 links the transmission elements $210_{nm}$ within the network 200 to processor 220. The network 200 may comprise any medium or combination thereof for data transmission such as: (a) parallel twisted pair copper lines for electrical transmission, (b) distinct wavelengths transmitted using fiber optics, or (c) microwave transmitters and associated receivers, operating via a medium such as air. If the microwave receivers are point to point, they may operate at the same frequency and if they are over a single channel the transmission may be coded (e.g., CDMA, TDMA) or at different frequencies.

Figure 3:
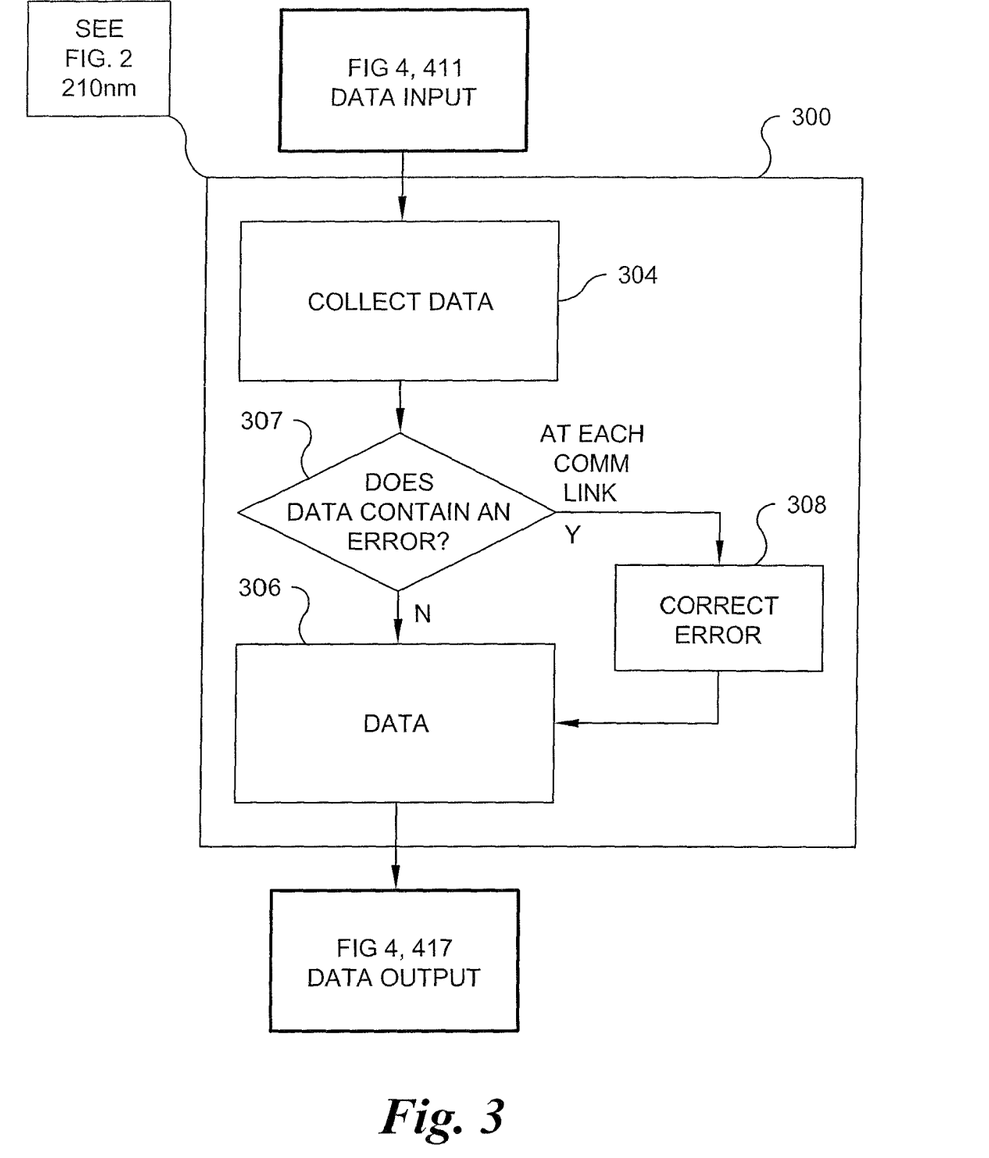
FIG. 3 is a process flow according to an embodiment of the present invention.
Figure 4:
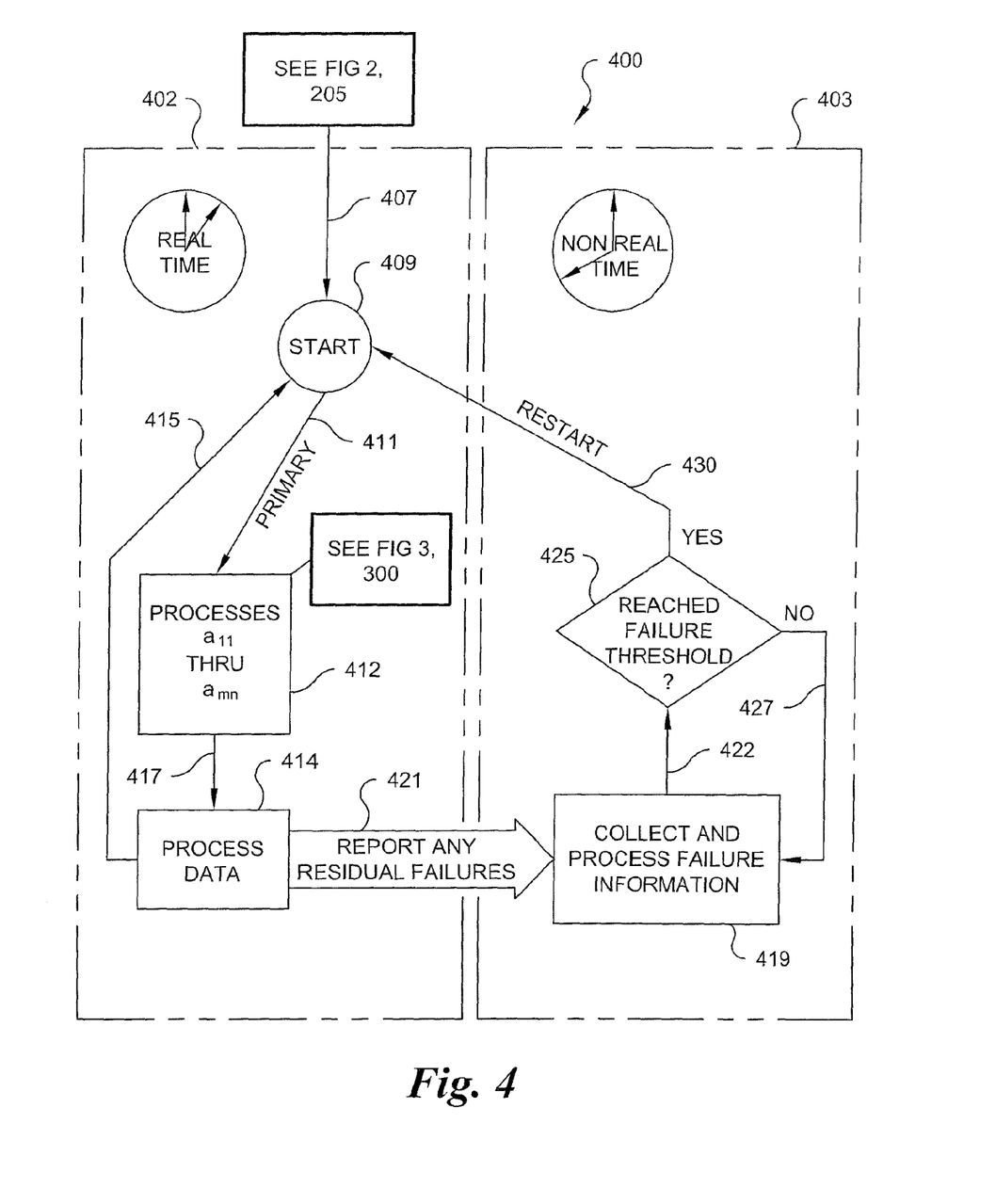
FIG. 4 is a flow chart of a process according to an embodiment of the present invention.

FIG. 3 and FIG. 4 represent related flow diagrams of processes that operate in conjunction with the network architecture 200 (FIGS. 2a, 2b) according to an embodiment of the present invention. Referring to FIGS. 3-4, a real time process labeled generally as 402 (see FIG. 4) enables transmission of forward error correctable data 407 to a plurality of parallel communication channels such as described in connection with FIGS. 2a, 2b. Each channel has a plurality of serially associated directional transmission elements each having one or more inputs for receiving the forward error correctable data. Processes labeled 412 in FIG. 4 are adapted to correct the data in error, as more fully described in FIG. 3. The forward error correctable data is received at a serially associated directional transmission element, and processing module 414 (FIG. 4) processes the data 417 from the last of the plurality of serially associated directional transmission elements (210 nm). If any failures or data errors remain at module 414 (e.g. residual failures) then such failures are reported via flow 421 to module 419 of non-real time processing flow module 403. The non-real time process compares in block 425 the number of error corrections in block 419 to a threshold; and if the number of corrections exceed the threshold then module 425 generates a signal that restarts via flow path 430 the process 409 for transmitting of forward error correction data in real time processing module 402. In this manner, if an error in the data is detected the non-real time process 403 compares to a threshold (in block 425) the total number of error corrections made or attempted during a transmission of given length, and if the number of error corrections exceeds the threshold, halts the transmission and restarts, resets or resynchronizes the transmission of data in real time.

Real time process 402 connects to a data source such as by data input 205 (see, FIGS. 2a, 2b). The process 402 begins by transmitting data 407 (e.g., a record, frame or packet) from a data source such as data input 205 (FIGS. 2a, 2b) to one of a plurality of serial data transmission element processes labeled as $a_{11}$ through $a_{nm}$ associated with corresponding directional transmission elements $210_{11}$ through $210_{nm}$ (FIG. 2b).

FIG. 3 is a flow diagram of a process 300 that works in conjunction with the process described in FIG. 4 according to an embodiment of the present invention. Also, each serial transmission element $210_{nm}$ as shown in FIG. 2b contains the processing function described in FIG. 3 for forward error correction. In each of the elements $210_{nm}$ the process 300 operates by collecting data 304 and testing the integrity of the data in process 307 as to whether it is error free. Typically the process 307 performs a forward error correction test such as a CRC check to determine if the data's integrity is in tact, i.e., that no errors are detected. Note that in FIG. 2b, each of the directional transmission elements $210_{nm}$, such as element $210_{11}$ processes an error correction and data integrity determination process, typically a CRC checker as described herein for each segment of a record, frame or packet being transmitted by a given transmission element $210_{mn}$. If the data, record, frame or packet contains an error determined by data integrity determination process 307, then a correction is made (module 308) and the corrected data is stored in buffer 306 for transmission to the next element in succession. The final element $210_{nm}$ transmits the data record, frame or packet for processing 414 in a processor such as processor 220 (FIGS. 2b, 4).

Again referring to FIG. 4, when the data record, frame or packet has progressed through each process labeled as $a_{11}$ through $a_{mn}$ associated with the corresponding directional transmission elements $210_{11}$ through $210_{mn}$ (FIG. 2b) it is input to real-time process 414 for a specific radar application. If an error computation, such as a CRC computation, indicates that no errors are present, then the CRC value appended to the data stream on transmission is stripped from the data stream and the data is stored in a system memory (e.g., resident in processor 220), and subsequently transferred via DMA to service various radar applications. Additionally, process 414 sends a signal 415 to indicate to data input start process 409 to transmit the next sequence (e.g., a record, frame or packet) of data through the physical network 200 (FIG. 2b) which is again received by real-time process 402.

If an error in the chain of transmission has occurred, the error is registered by process 414 and is communicated (via flow path 421) to non-real time process 403 that includes a means for the collection and processing of error information (block 419). A count of the error corrections made to the data is computed in module 419 and communicated via signal 422 to a comparing process 425 to determine whether the number of errors has exceeded a threshold value. If the number of errors has not exceeded the threshold then processing returns via flow path 427 to continue to collect and process failure statistics at module 419. If the threshold is exceeded then a signal 430 indicates to data input process 409 to restart the process module 402. The restart process may reset the module entirely or cause it to transmit the most recent record, frame or packet of data through the network.

Figure 5A:
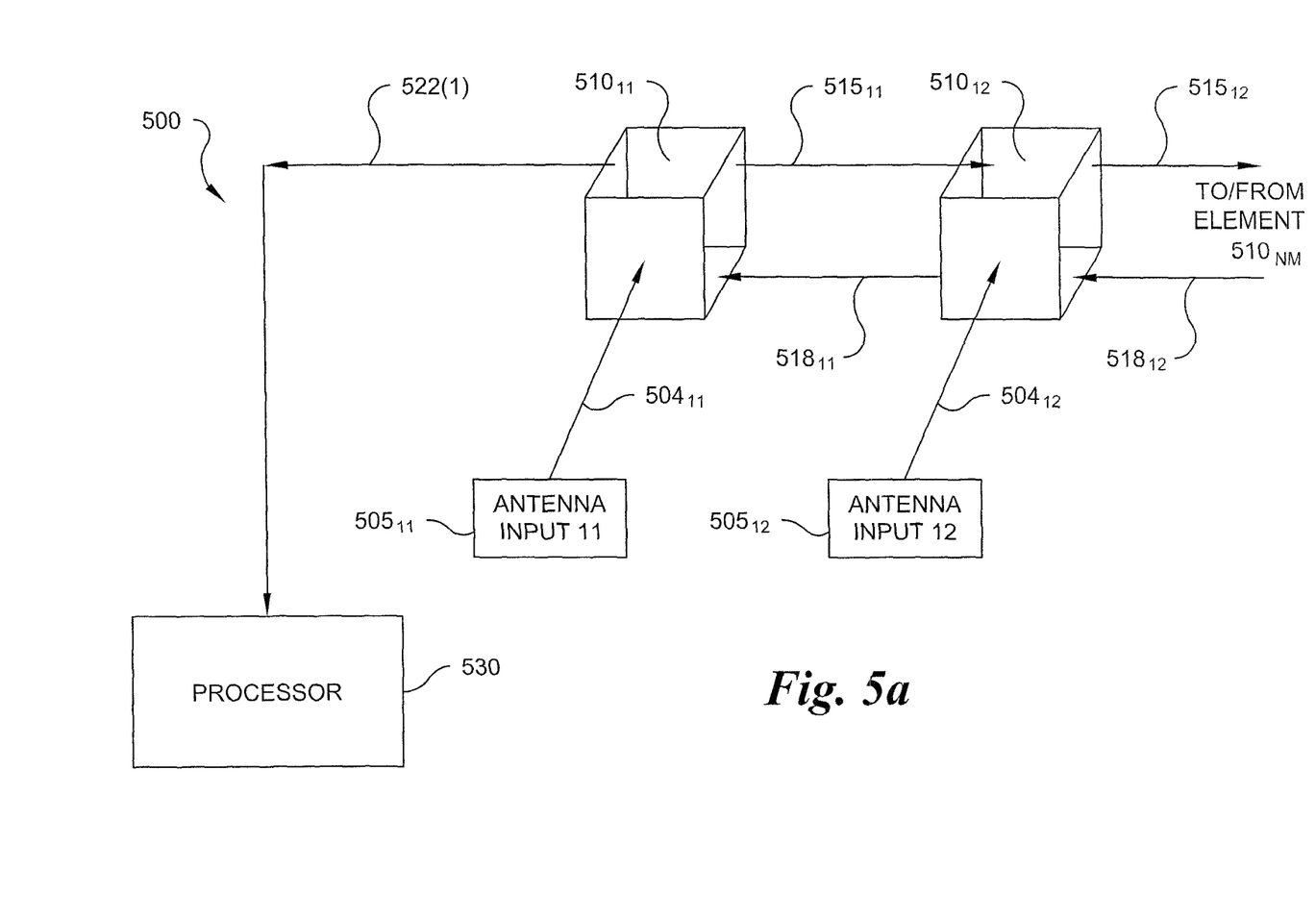
FIG. 5a is a partial block diagram of a system according to an embodiment of the present invention.

FIG. 5a is a block diagram of a system according to an embodiment of the present invention whereby a high-speed data network 500 receives radar data from data input 505 such as antenna element 11 in real time. The real time data from data input 505 is communicated through network 500, which is received by processor 530. It is understood that data input 505 may be embodied by a radar antenna or a computer having a memory that stores radar data from an array of antenna elements. Further by way of example, the data input labeled generally as radar 505 may transfer via DMA engine to network 500 by way of example a computer and memory for processing. Each transmission element $510_{11}$ through $510_{nm}$ may also perform the functions, as by way of example, any type of parity check or checksum such as a CRC to detect accidental alteration of the data during transmission or storage. The parallel communication channel $504_{11}$ data is accumulated in element $510_{11}$ with forward error correctable data $518_{11}$ and passed through on line $522_1$ to processor 530. The parallel communication channel $504_{11}$ data is also passed through on line $515_{11}$ to element $510_{12}$ where it is accumulated with the data on the parallel communication channel $504_{12}$. Element $510_{12}$ accumulated data on parallel communication channel $504_{12}$ and forward error correctable data $518_{11}$ is passed through on line $515_{12}$ to elements down the serial chain of elements to a final element $510_{nm}$.

Figure 5B:
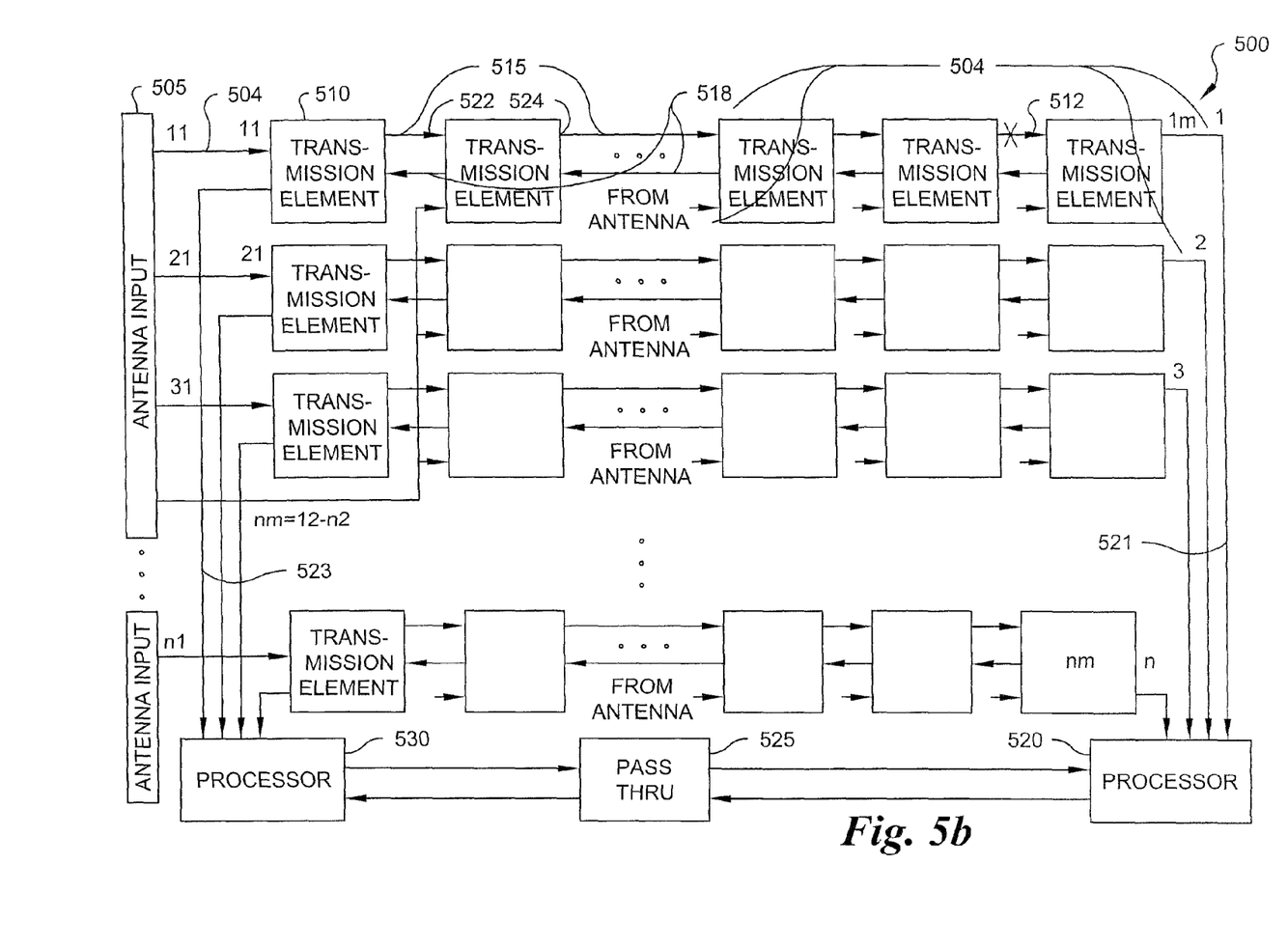
FIG. 5b is a block diagram of a system according to an embodiment of the present invention.

In the block diagram illustrated in FIG. 5b one or more communication channels 504 through $504_n$, 1 through n, feed bi-directional transmission elements $510_{nm}$, such as $510_{11}$ that work in parallel with other parallel communication channels $504_2$ through $504_n$ having bi-directional transmission elements such as $510_{12}$ to obtain a higher aggregate data rate. Input from the antenna is not shown on each element to simplify the diagram, but the antenna input is received by each element $510_{nm}$ as described in connection with FIG. 2b. Each communications channel $504_1$ through $504_n$, has a plurality of serially associated directional transmission elements $510_{nm}$, each with two or more inputs 522 for receiving antenna data and forward error correctable data, and two or more outputs 524 for transmitting forward error correctable data. Each transmitting element such as $510_{11}$ transmits data to the next element in the same channel $504_1$, such as by way of example transmission element $510_{11}$ that transmits data the next element, in this case $510_{12}$ and also receives data from element $510_{12}$. The transmission elements $510_{nm}$ may be achieved utilizing components, such as a serializer/deserializers, as the actual transmission elements $510_{nm}$. The data is parsed and inputted into the elements $510_{nm}$ as bytes having length n. However, as is apparent from FIG. 5b, the parsed and inputted data flows in two directions. In a typical example, as illustrated in FIG. 5b, first channel 1 receives bytes 1, 5 and 9; whereas second channel 2 receives bytes 2, 6 and 10, etc. The transmission elements $510_{nm}$ may also encode the data, as for example 16 bits into 20 bits (e.g., 8 bits/10bit encoding) for transmission over physical network 500 having the parallel channels $504_1$ through $504_1$, via associated transmission elements, such as transmission elements $510_{12}$ through $510_{1m}$ that may support serial interfaces in high-speed data network applications. The bi-directional transmission elements $510_{nm}$, such as $510_{11}$ are adapted to process missing data correction schema, as will be further discussed in connection with FIG. 6, for each transmission segment (e.g., a record, frame or packet). Upon detection of a missing datum (or data) a correction schema attempts to supply the data. The data is communicated over transmission medium 518, 521,523 that serve as links between the transmission elements $510_{nm}$ within the physical network 500. The final element $510_{nm}$ transmits the data, record, frame or packet for processing as will be described in connection with FIG. 6. The physical network 500 may comprise any medium or combination thereof for data transmission.

Again referring to FIG. 5b, the final elements $510_{nm}$ transmit the data, record, frame or packet to processor 520 for a specific radar application. In addition to the data, record, frame or packet to processor 520, the data from data input 505 is also transmitted from the initial elements $510_{nm}$ to transmit the data, record, frame or packet to a processor 530 for a specific radar application. In the event there is malfunction in the transmission channel such as a disconnect 512, the data in processor 530 is passed through a switch 525 to processor 520, thereby restoring the integrity of the data input from 505. Similarly, in yet another embodiment of the invention, a failure in a transmission element such as $510_{12}$ will not disable the system inasmuch as the data flows to the processors 530, 520 via alternate paths 523, 521, respectively.

Figure 6:
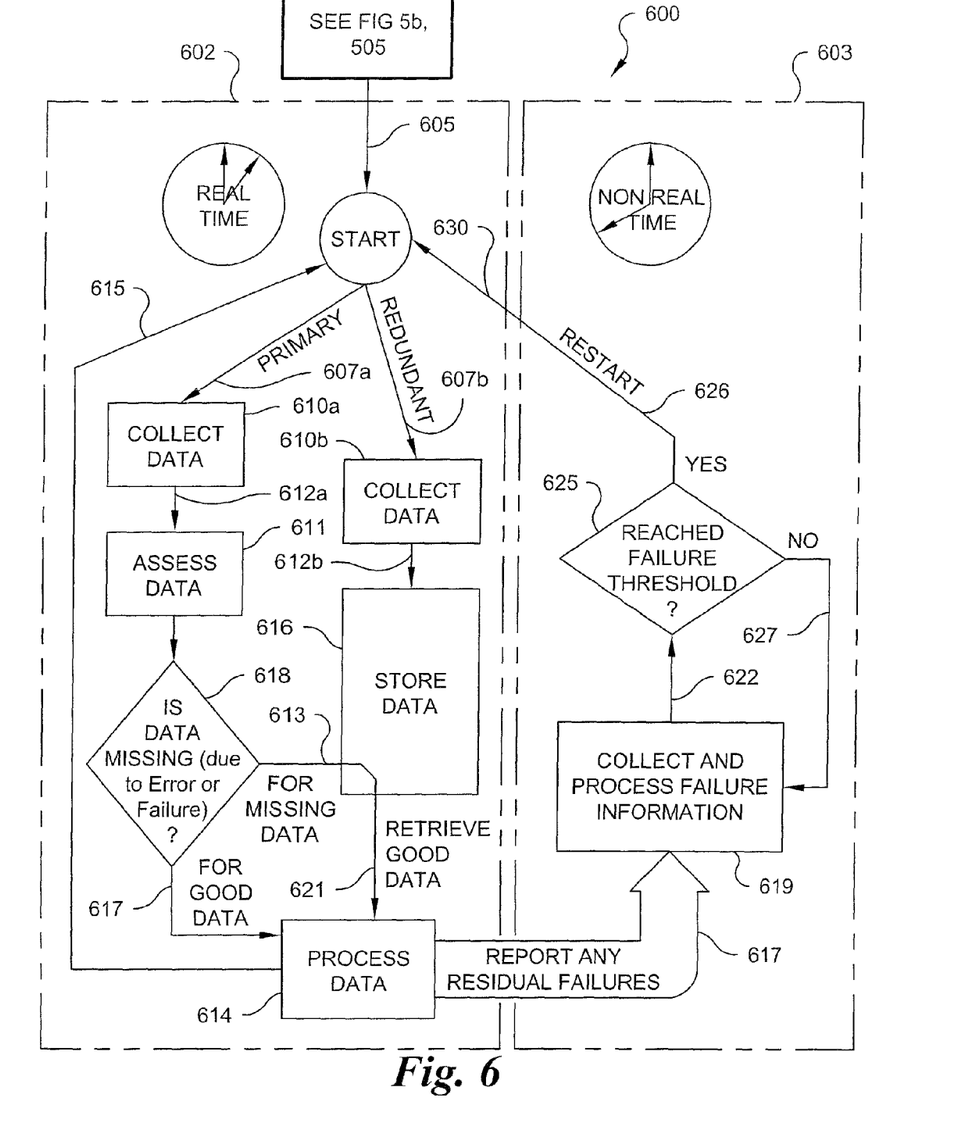
FIG. 6 is a process flow according to an embodiment of the present invention.

FIG. 6 is a flow diagram of a process 606 according to an embodiment of the present invention that optionally works in conjunction with the system illustrated in FIGS. 5a and 5b. The process 600 is divided into two sub processes: a real time process 602 and a non-real time process 603. Real time process 602 connects to a data source such as by way of example the data input 505 (see, FIG. 5b). Process 602 begins by transmitting data (e.g., a record, frame or packet) from a data source such as data input 505 (FIG. 5b) to one of a plurality of data transmission element processes associated with corresponding bi-directional transmission elements $510_{11}$ through $510_{nm}$ (FIG. 5b).

Again referring to FIG. 6, the data record, frame or packet progresses in a primary direction 607a, and in the reverse or redundant direction 607b through each bi-directional transmission elements $510_{11}$ through $510_{nm}$ and is collected by two independent buffers 610a and 610b that may exist in each of bi-directional transmission elements $510_{11}$ through $510_{nm}$. The data stored in buffer 610a is transferred (via flow 612a) to a process 611 to assess the integrity of the data (see, FIG. 3 for an exemplary process). The data stored in buffer 610b is transferred (via flow 612b) to a data storage device 616 for storing the collected data while awaiting a signal to transfer the data in the event data is determined to be missing during the process 602. In one embodiment storage device 616 forwards the data to process 614 while the integrity of the data is assess in testing process 618. The data residing in buffer 610a is assessed (block 611) by testing process 618 to determine among other things if there is missing data and/or erroneous data. As indicated, this testing may be in addition to element $510_{11}$ through element $510_{nm}$ error correction functions as outlined in connection with the processes disclosed in FIG. 3 and FIG. 4. If data is determined to be missing 613, then the process 602 accesses (module 621) the data stored in data buffer 616, which is data having a higher integrity.

If missing data had been detected during one or more of process 602 data transfer, an error registers through a process (not shown) in module 614 and is communicated (via flow 617) to a non-real time process 603 that includes a means for the collection and processing of error information module 619. A count of the number of errors is computed in the means for the collection and processing of error information (module 619) and communicated (via flow 622) to a compare process 625 to determine whether the number of errors have exceeded a threshold value. If the number of errors does not exceed the threshold then the process block 603 continues via flow path 627 to collect failure statistics at module 619. If the threshold is exceeded, then a signal 630 via flow path 626 indicates to data input source start 605 to restart the real time process 602. Alternatively, the restart process may reset the process block 602 entirely or have the network 500 (FIG. 5), transmit the most recent record, frame or packet of data through the network 500.

Figure 7:
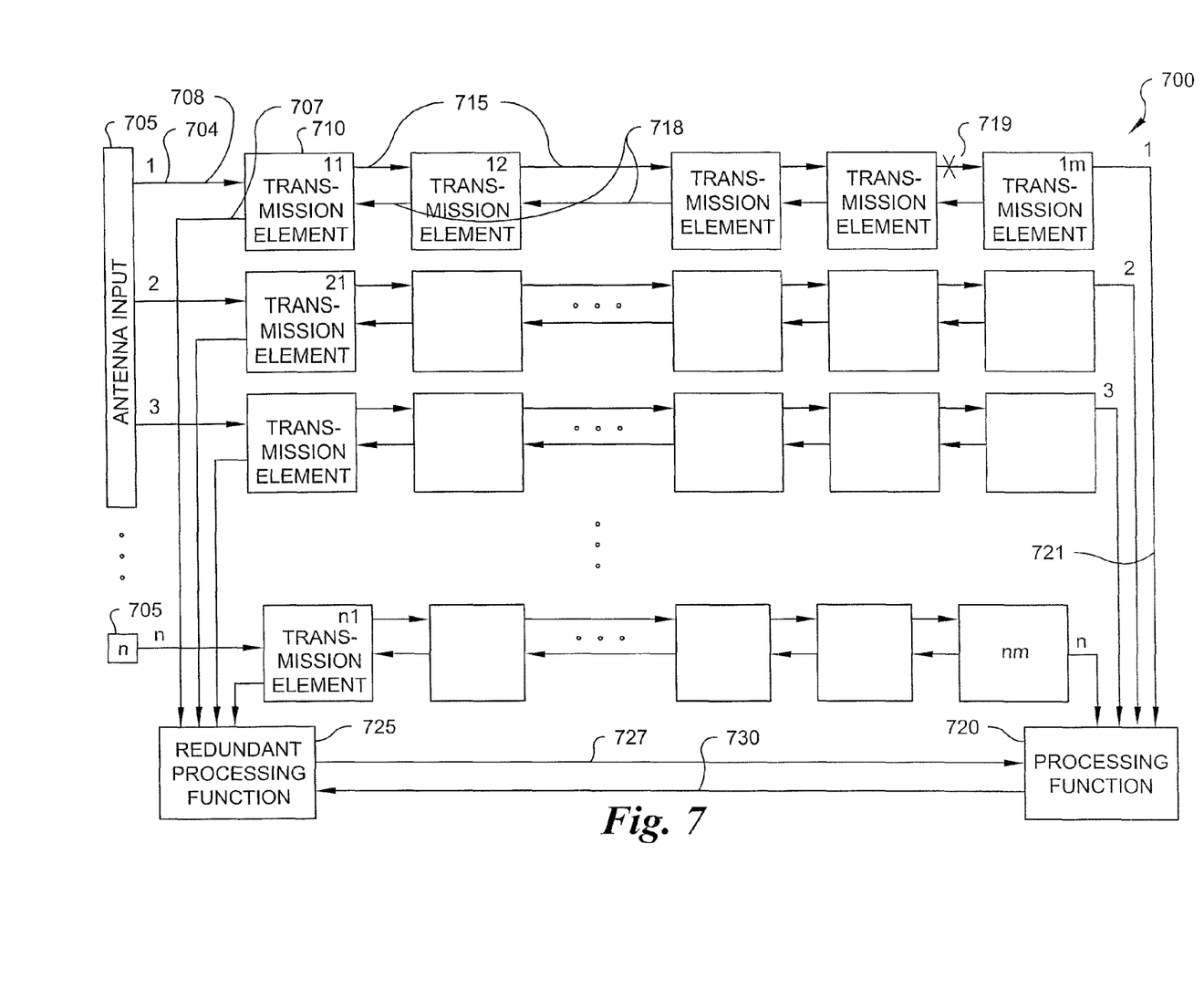
FIG. 7 is a block diagram of a system according to an embodiment of the present invention.

In another embodiment of the invention a network 700 as shown in FIG. 7 comprises one or more parallel communication channels $704_1$ through $704_n$ bi-directional transmission elements $710_{nm}$, such as $710_{11}$ that work in parallel with other channels $704_2$ through $704_n$ having bidirectional transmission elements such as $710_{12}$ to obtain a higher aggregate data rate. Input from the antenna is not shown on each element to simplify the diagram, but the antenna input is received by each element $710_{nm}$ as fully described in connection with FIG. 2b. As previously described in connection with FIGS. 5, 6 each transmitting element such as $710_{11}$ transmits data to the next element in the same channel 704, such as to transmission element $710_{12}$, and also receives data from $710_{12}$. In respect of data formats, materials and processes of transmission, the network 701 operates similarly to that described for network 500, including communicating over transmission media 715, 718, 721. Also as in FIG. 5b upon detection of missing data 719, the correction schema attempts to supply the original data via a redundant system. In network 700 the data received via data antenna data input 705, such as a radar antenna that is communicated through the network 700, is received in real time by processors 720 and 725. Additionally processors 720 and 725 exchange the exact data among one another over transmission medium 727 and transmission medium 730. Essentially, the transmission media 727, 730 serve as links between the two independent processing functions 720 and 725, respectively, within the network 700.

Again referring to FIG. 7, the final elements $710_{nm}$ in the serial chain transmit the data, record, frame or packet to processor 720 for a specific radar application. In addition to the data, record, frame or packet sent to processor 720, the data from antenna data input 705 is also transmitted from the initial elements in the form of data, records, frames or packets to redundant processor 725 for a specific radar application. In the event there is a malfunction in the transmission channel such as a disconnection resulting in missing data 719 for any reason, the data in processor 725 is utilized by processor 720, restoring the integrity of the antenna data input from 705.

Figure 8:
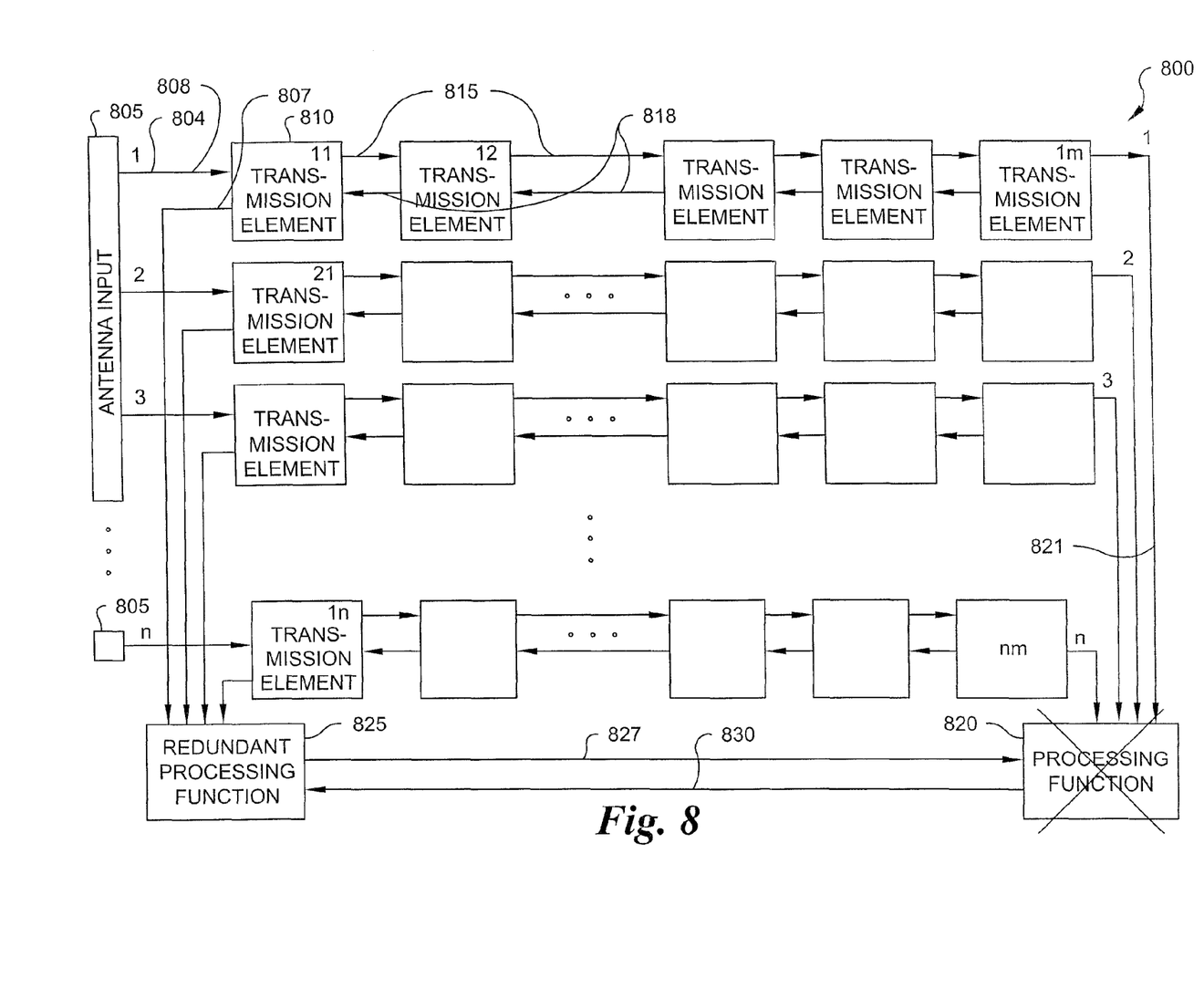
FIG. 8 is a block diagram of a system according to an embodiment of the present invention.

In yet another embodiment of the invention a network 800 as shown in FIG. 8 comprises one or more communication channels 804 that receive input from antenna data 805. Channels 804, through $804_n$ are each comprised of bi-directional transmission elements $810_{nm}$, such as $810_{11}$ (for channel $804_1$) that work in parallel with other channels $804_2$ through $804_n$ having bi-directional transmission elements to obtain a higher aggregate data rate. Input from the antenna is not shown on each element to simplify the diagram, but the antenna input is received by each element $810_{nm}$ as described in connection with FIG. 2b. As previously described in connection with FIGS. 5 and 7, each transmitting element such as $810_{11}$ transmits data to the next element in the same channel 804, such as to transmission element $810_{21}$, and also receives data from element $810_{21}$. In respect of data formats, materials and processes of transmission, the network 800 operates similarly to that described for networks 500 and 700 shown in FIGS. 5 and 7, including communicating over transmission media 815, 818, 821. Also as in FIGS. 5b and 6, upon detection of missing data, the correction schema attempts to supply the original data via a redundant system. As described in connection with network 700 of FIG. 7, network 800 data is communicated in real time between processors 820 and 825 over transmission media 827, 830 that serve as links between the two independent processing functions 820 and 825, respectively within the physical network 800.

Again referring to FIG. 8, the final elements $810_{nm}$ in the serial chain transmit the data, record, frame or packet to processor 820 for a specific radar application. In addition to the data, record, frame or packet sent to processor 820, the data from antenna data input 805 is also transmitted from the initial elements $810_{nm}$ in the form of the data, records, frames or packets for to the redundant processor 825 for a specific radar application. In the event there is a malfunction in the processor 820 for any reason, the data in processor 825 is utilized, restoring the integrity of the antenna data input 805 for the radar, application.

Figure 9:
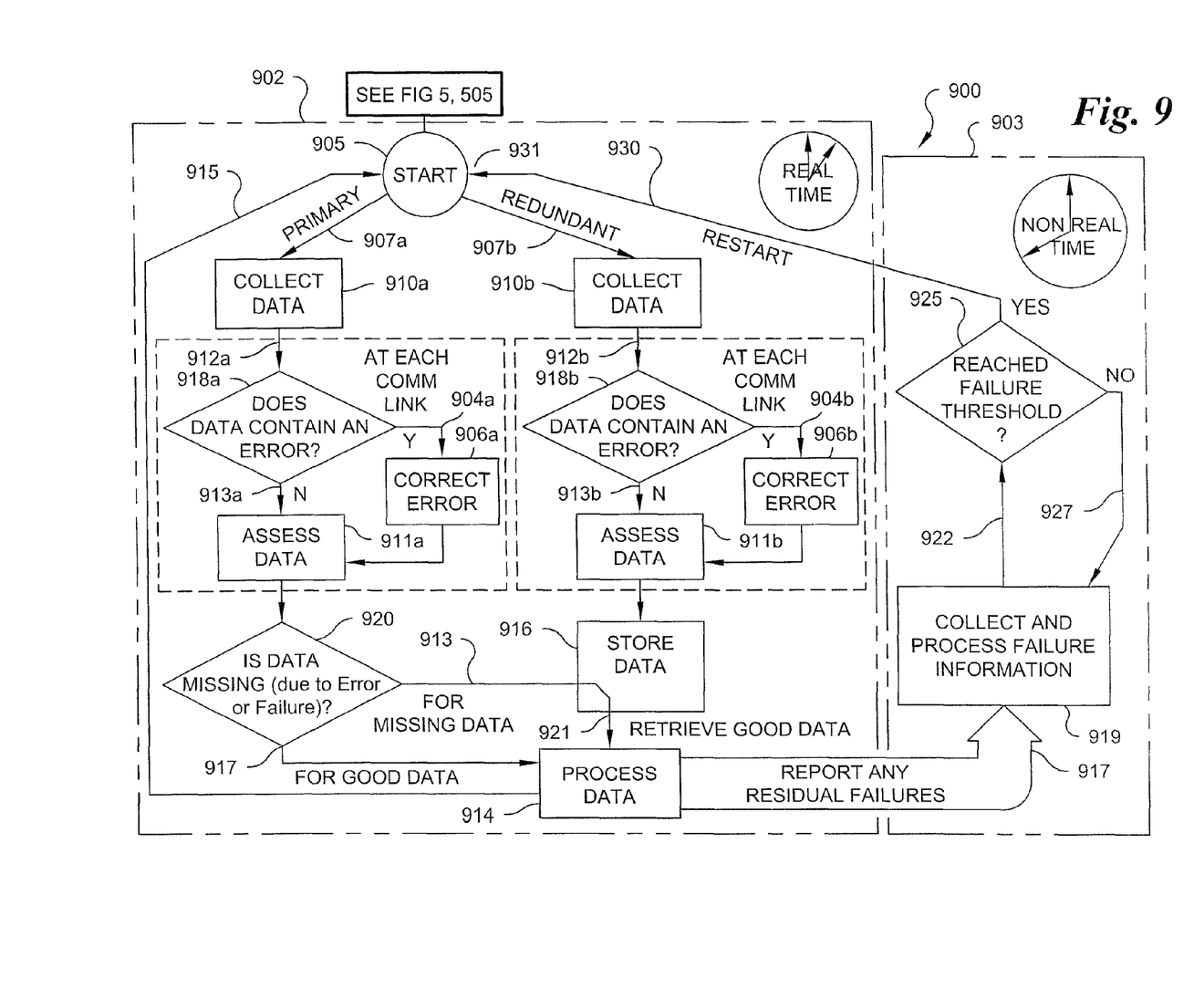
FIG. 9 is a process flow according to an embodiment of the present invention.

FIG. 9 is an illustration of a process flow 900 according to an embodiment of the present invention that optionally works in conjunction with the systems described in FIGS. 5, 7 and 8. The process 900 is divided into two sub processes, a real time process 902 and a non-real time process 903. Real time process 902 connects to a data source such the data input 505 (see, FIG. 5b). Process 902 begins by transmitting data (e.g., a record, frame or packet) from a data source such as data input 505 (FIG. 5b) to one of a plurality of data transmission element processes associated with corresponding bi-directional transmission elements $510_{11}$ through $510_{nm}$ (FIG. 5b).

The data record, frame or packet progresses via flow paths 907a, 907b through each bidirectional transmission elements $510_{11}$ through $510_{nm}$ and is also collected by two independent buffers 910a and 910b. The data from each buffer 910a, 910b is separately input to process 912a, 912b respectively, to assess the integrity of the data. Processes 912a and 912b operate substantially in accordance with that described and shown in FIG. 3. The processes 912a and 912b each test in modules 918a, 918b whether the data is error free. Typically the processes 918a, 918b perform a CRC check to determine if the data's integrity is in tact, i.e., that no errors are detected. Note that in FIG. 5b, each directional transmission element $510_{nm}$ such as $510_{11}$ may under the schema presented in FIG. 9 via process 912a, 912b, perform an error correction and data integrity determination process (e.g. a CRC check) for each segment of a record, frame or packet being transmitted 505 by transmission elements $510_{nm}$. If the data, record, frame or packet contains no error as determined by data integrity determination processes 918a, 918b, then the data conveyed via flow paths 913a, 913b is stored directly into corresponding buffers 911a, 911b for further transmission to the next transmission element. If the data, record, frame or packet contains an error (transmitted by flow paths 904a, 904b), determined by data integrity determination processes 918a, 918b, then the data is and corrected 906a, 906b. The corrected data is stored in buffers 911a, 911b for transmission to the next element $510_{nm}$ in succession. The final element $510_{nm}$ transmits the data, record, frame or packet to a processor such as processor 520 (FIG. 2b).

The data stored in the final element $510_{nm}$ transmits the data, record, frame or packet to a processor such as processor 520 (FIG. 2b) where it is tested via module 920 to determine, among other things, if there is missing data and/or erroneous data. The missing data testing is performed in addition to elements $510_{11}$ through $510_{nm}$ error correction functions as outlined in connection with the processes 912a, 912b. If data is determined to be missing, then the process 902 accesses through flow paths 913 the data stored in data buffer 916, which is data having increased integrity.

If a missing data had been detected during one or more of process 902 data transfer, an error registers through a process (not shown) in process 914 and is communicated via flow path 917 to a non-real time process 903 that includes a means for the collection and processing of error information module 919. A count of the number of errors is computed and communicated via flow path 922 to a compare process 925 to determine whether the number of errors have exceed a threshold value. If the number of errors have not exceed the threshold, then the process 903 continues via flow path 927 to collect failure statistics (module 919). If the threshold is exceeded, then a signal 931 is sent via flow path 930 indicating to data start module 905 to restart the process 902. Alternatively, the restart process may reset the process module 902 entirely or have the system FIG. 5 transmit the most recent record, frame or packet of data through the physical network 500.

With reference to FIG. 2a through FIG. 9 it is understood that the processors and associated processing used to effect the recovery of missing data and correction of erroneous data in networks can be implemented in hardware, software, firmware, or combinations thereof. It is also to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. Generally the software processes may exist in a variety of forms having elements that are more or less active or passive. For example, they may exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals are signals that a computer system hosting or running the computer program may be configured to access, including signals downloaded through the Internet or other networks. Examples of the foregoing include distribution of the program(s) on a CD ROM or via Internet download.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A real time radar data transmission system comprising: a plurality of parallel communication channels, each channel having a plurality of serially associated directional transmission elements and having one or more inputs for receiving forward error correctable data and one or more outputs for transmitting forward error correctable data; wherein at least one of the plurality of the directional transmission elements receives the forward error correctable data and corrects the data in error; and transmits the forward error correctable data to a serially associated directional transmission element; and wherein the data from the last of the plurality of serially associated directional transmission elements provides input to a hardware processor configured to execute instructions to utilize the forward error correctable data in a radar application; and wherein when an error in the data is detected a first process compares to a threshold the total number of error corrections made or attempted during a transmission of arbitrary length, and if the number of representing error corrections exceeds the threshold said first process generates a signal for resynchronizing transmission of data in real time.

2. The system of claim 1, wherein the data includes data encoded with a set of check characters in accordance with the forward error correctable data, wherein the forward error correctable data is a member of a class of cyclical block codes.

3. The system of claim 1, wherein the data includes data encoded with a set of check bits in accordance with the forward error correctable data, wherein the forward error correctable data is a member of one of the group of: parity codes, cyclic redundancy checks, single error correcting (SEC), double error detecting (DED), convolutional codes and block codes.

4. The system of claim 1, wherein serially associated directional transmission elements each having one or more inputs for receiving forward error correctable data accumulate the data from the one or more inputs and output accumulated forward error correctable data.

5. The system of claim 1, wherein the directional transmission elements are bi-directional transmission elements.

6. The system of claim 3, wherein the block codes includes one of Hamming codes, Reed-Solomon codes, Reed-Muller codes, Binary Golay codes and Bose-Chaudauri-Hocquenghem Codes.

7. The system of claim 5, wherein the bi-directional transmission elements are configured for recovery of missing data.

8. A radar data transmission process comprising:
transmitting forward error correctable data to a plurality of parallel communication channels, each channel having a plurality of serially associated directional transmission elements having one or more inputs for receiving forward error correctable data;
receiving the forward error correctable data;
correcting the data in error;
transmitting the forward error correctable data to a serially associated directional transmission element;
processing the data from the last of the plurality of serially associated directional transmission elements;
comparing in non-real time a number of error corrections made to the data to a threshold; and
if the number of corrections exceed the threshold then resynchronizing the transmitting of forward error correction data in real time.

9. The process of claim 8, wherein the directional transmission elements provide uni-directional data flow.

10. The process of claim 9, wherein the data is forward correctible data in each directional transmission element.

11. The process of claim 8, wherein the directional transmission elements provide bi-directional data flow.

12. The process of claim 11, wherein the data is forward correctible data in each directional transmission element and provides for recovery of missing data.

13. The process of claim 12, wherein responsive to detection of missing data, a correction schema is invoked to provide replacement data.

14. The process of claim 11, wherein the data is transmitted to a first processor and to a second processor, each processor configured to pass the forward error correctable data to the other processor.

15. The process of claim 14, further including passing the forward error correctable data in the first processor through a switch to the second processor to restore the integrity of the data when a malfunction occurs in one or more transmission channels.

16. The process of claim 13, wherein responsive to detection of missing data, the correction schema provides the replacement data as the original data through a redundant processor.

17. The process of claim 11, wherein data is communicated in real time over transmission media that link at least two independent processing functions.

18. The process of claim 11, wherein data is communicated in real time over transmission media for a specific radar application.

19. The process of claim 11, wherein data is communicated in real time over transmission media to one or more redundant processors for a specific radar application.

20. The process of claim 11, where each bi-directional transmission element collects two related data streams.

21. The process of claim 11, wherein each bi-directional transmission element collects two related data streams and accumulates the data from the data streams before outputting forward error correctable data.

* * * * *